(«12») United States Patent
Austria et al.

(10) Patent No.: US 8,372,503 B2
(45) Date of Patent: Feb. 12, 2013

(54) FORMABLE TRAY

(76) Inventors: Georgene Austria, Woodland Hills, CA (US); Brian Mach, Oldsmar, FL (US)

(*) Notice: Subject to any disclaimer, the term of this patent is extended or adjusted under 35 U.S.C. 154(b) by 214 days.

(21) Appl. No.: 12/814,464

(22) Filed: Jun. 13, 2010

(65) Prior Publication Data

US 2011/0052858 A1    Mar. 3, 2011

Related U.S. Application Data

(60) Provisional application No. 61/237,291, filed on Aug. 26, 2009.

(51) Int. Cl.
*B32B 3/02* (2006.01)
*B32B 3/08* (2006.01)

(52) U.S. Cl. .................................. 428/77; 428/78
(58) Field of Classification Search ............ 428/78, 428/77
See application file for complete search history.

(56) References Cited

U.S. PATENT DOCUMENTS

| | | |
|---|---|---|
| 3,696,920 A | 10/1972 | Lahay |
| 3,785,544 A | 1/1974 | Smith |
| 3,916,448 A * | 11/1975 | Hamel ........................ 2/2.5 |
| 4,971,271 A | 11/1990 | Sularz |
| 5,036,866 A | 8/1991 | Eldrige et al. |
| D341,883 S | 11/1993 | Jones et al. |
| D378,408 S | 3/1997 | Pyeatt et al. |
| 5,765,470 A | 6/1998 | Sitro |
| 5,964,161 A | 10/1999 | Conway |
| 5,968,663 A | 10/1999 | Muggli |
| D449,685 S | 10/2001 | Morrison |
| D479,328 S | 9/2003 | Reynolds et al. |
| D504,175 S | 4/2005 | Westbrook |
| D528,206 S | 9/2006 | Bierman |
| 2005/0204932 A1 | 9/2005 | Tingley |
| 2006/0027104 A1 | 2/2006 | Perez, Jr. |
| 2008/0173187 A1 | 7/2008 | Baker |
| 2009/0267717 A1 | 10/2009 | Baskett |

* cited by examiner

*Primary Examiner* — Brent O'Hern
(74) *Attorney, Agent, or Firm* — Law Office of Ken Dallara; Ken Dallara (57) ABSTRACT

A self-sustainable formable tray is presented which possesses the abilities to be formed in any form or manner as the application desires. The tray can be used in the medical field where flexibility, formability, sterility and cleavability are desirable. Though designed with several adaptations in purpose, there are a myriad of fields of applications. The formable tray is designed for repeatable forming and cleaning cycles. The uniqueness of the tray is the ability for the tray to conform to trays, mandrels and forms using only human supplied pressures. The formable tray includes two layers of silicone or similar sheeting completely encapsulating flexible stiffening means. This flexible stiffening means will hold the device in various configuration as designed by the user. This flexible stiffening means include a stainless steel membrane, which can be magnetic completely, spot magnetized or be non-magnetic at the users behest, a metallic mesh or metallic rods.

15 Claims, 12 Drawing Sheets

FORMABLE TRAY

CROSS-REFERENCE TO RELATED APPLICATIONS

This application claims benefit of prior filed provisional application No. 61/237,291 entitled "Medical Instrument Formable Tray" filed on Aug. 26, 2009 in the name of Georgene Austria and Brian Mach, said provisional application being hereby incorporated by reference as if fully set forth herein.

BACKGROUND OF THE INVENTION

The present invention relates generally to stability enhanced silicone or similar heat resistant synthetic materials that maintain their flexibility through many temperature cycles and will not deteriorate during multiple cleanings. The silicone material is laminated about another flexible, yet formable stiffening member to enhance the stability of the invention. This laminated sheet is then used for a variety of purposes. This application will disclose the use of this laminated sheet in the medical and food services industries but the application of this invention to other industries is foreseen. In the medical industry, the sheet can be used in transfer trays and instrument holders used for the transfer, storage and delivery of sharps (i.e. scalpels, needle drivers and other surgical instruments with sharp edges) between the nurse and the surgeon to prevent cuts and injuries as well as serve as a stability-enhanced "drape" that is placed upon the patient to hold instruments and the like. The resilient yet flexible nature of the sheet prevents the dulling of the sharps as they are prevented from scraping against metal tray and pans as well as serve as a sterile transfer vehicle. The formability of the invention allows for a myriad of customization.

It can be appreciated that stainless steel medical trays have been used for years. Typically, trays are comprised of "neutral zones" and "transfer" basins. The main problem with conventional trays is that they limit the end user to the size and shape when passing or transferring sharps and surgical instruments. Another problem of conventional trays in their ability to remain stable on top of an uneven surface such as a patient. It should be noted that instruments are generally placed on top of the patient lying prone or lateral during a surgical procedure allowing easy access from the nurse and the surgeon of instruments during the surgical procedure while maintaining sterility. This presents a problem in the prior art as current methods have an inability to hold and keep instruments in place. Some prior art suggests the use of magnets to hold the instruments in place. Though a common practice, there are many drawbacks to the use of magnets around delicate electronic medical devices, such as pacemakers and the fact that used instruments can contaminate the areas where they are placed. Instruments can also be magnetized by the placing and movement of stainless steel medical instruments over drapes with the magnets placed therein. This temporary magnetization can be harmful and is often not realized. Also bodily fluids that are associated with some of the instruments are allowed to flow across the mat, causing sterilization issues.

Trays are also often used to hold instruments allowing for separation of clean and dirty instruments and the containment of bodily fluids. Due to the limitation of the "fixed" shaped trays only a limited number of instruments can be accommodated at any given time (usually only 1). A current problem with using trays is that most of the reusable trays are made of stainless steel. When sharps, instruments or devices with sharp ends such as needle, scalpels or scissors, move about inside the metal container their tips are frequently "slammed" against the walls of the tray causing the sharps to dull. A dull sharp can be detrimental to the use and application of the sharp. In addition to this, because of the "free" movement of the instruments in their containment, there is a chance of the instrument to slip, slide and fall during passing and handling that causes injuries.

Some of the prior art attempts to mitigate some of the drawbacks of other prior art in creating "dead zones" or non-magnetic areas of the mat, such as U.S. Pat. No. 5,036,866 assigned to Devon Industries or published application 2009/0267717 by Baskett. Both attempt to accommodate the fact that some areas of the mat can be magnetic depending upon the users needs. Baskett presents a complicated method of adding or removing magnets while Devon presents a mat that is static in nature. While the Devon mat presents a device that does have formable edge, thin stiffening members are only introduced in the parameter areas and produce an upwardly extending peripheral end but does not allowing for any containment to the sides of the mat and can only affect the peripheral portion of the drape.

In the food industry, the use of silicone baking items is very prevalent. Silicone has a very high heat resistance and has inherent anti-stick qualities. This invention allows for the customization of the silicone baking sheets, contouring itself to fit the application, whether flat for baking or "escalloped" for baking French style of breads.

In this respect, the present invention substantially departs from the conventional concepts and designs of the prior art, and in doing so provides an apparatus that offers a "safety zone" for "hands free" transfer of medical sharps and instruments and a means for preventing damage to exposed medicals sharps, along with the ability to cleanse and autoclave the device, this high temperature cleaning and sterilizing capacity makes it perfect for the baking industry as well.

In the baking industry, this device can be formed into laterally supportive bread baking forms or used as a basic flat sheet. Current baking methods of laterally supporting certain kinds of breads while raising and baking can be accomplished with this device. As every baking operation is attempting to reduce the number of purchases of specialized baking equipment, equipment that can perform multiple uses is desirable. The baking industry is also desirable to using silicone baking utensils as they do not require extra coatings or agents to produce a non-slip surface which decrease costs and makes healthier products. Another advantage of silicone sheeting in baking is that they match the temperature of the oven or freezer much more quickly than their aluminums counterparts, and equally adjust to room temperature quickly decreasing the injuries due to hot pans coming in contact with the users. Yet there are current problems associated with silicone baking items is that, due to their inability to hold a shape, they require extra apparatuses to hold them in form, which increases costs. A silicone baking apparatus that can hold it's shape would eliminate the problems associated with current silicone baking sheets and pans.

SUMMARY OF THE INVENTION

In view of the foregoing disadvantages inherent in the known types of trays now present and prior art, the present invention provides a new instrument transfer and delivery tray construction wherein the same can be utilized for providing a "safety zone" for "hands-free" transfer of sharps and instruments. The general objective of the present invention, which will be described subsequently in greater detail, is to provide a new instrument transfer and delivery tray that has many of the advantages of the trays mentioned heretofore and many novel features that the Form A Tray which is not anticipated, rendered and obvious, suggested, and even implied by any of the prior art trays, either alone or any combination thereof. To attain this, the present invention is generally comprised of a formable tray. There has thus been outlined, rather broadly, the more important features of the invention in order that the detailed description thereof may be better understood, and in order that the present contribution to the art may be better appreciated. There are additional features of the invention that will be described hereinafter. In this respect, before explaining at least one embodiment of the invention in detail, it is to be understood that the invention is not limited in its application to be the details of construction and to the arrangements of the components set forth in the embodiments and of being practiced and carried out in various ways. Also, it is to be understood that the phraseology and terminology employed herein are for the purpose of the description and should not be regarded as limiting.

A primary object of the present invention is to provide a device that is used for the transfer, storage and delivery of sharps between the nurse and the surgeon to prevent cuts, needle sticks and injuries that will overcome the short comings of the prior art devices.

Another object is to provide an instrument transfer and delivery tray that provides a safety zone for "hands free" passing or transfer of sharps instruments.

Another object is to provide an instrument transfer and delivery tray that possesses the ability to be flexible to conform to the application required and to be autoclavable and other forms of sterilization such as gamma sterilization.

Another object is to provide an instrument transfer and delivery tray that provides operating room personnel versatility in the operating room by being able to be used as a tray liner or to be able to hold a tray-like shape outside of the tray.

Another object is to provide an instrument transfer and delivery tray that eliminates dangerous dulling of sharps and instruments during surgical procedure associated with their accidental striking contact with the sides of metal trays during movement.

It is another object of this invention is to create a baking sheet that is formable to the need of the individual baking application.

Another object and advantage of the present invention will become obvious to the reader and its intended that these objects are advantages are within the scope of the present invention.

To the accomplishment of the above and related objects, the invention may be embodied in the form of illustrated in the accompanying drawings, attention being called to the fact, however, that the drawings are illustrative only, and that changes may be made in the specific construction illustrated.

DETAILED DESCRIPTION OF THE INVENTION

Figures 1, 2, 3, 4, 5, 6:
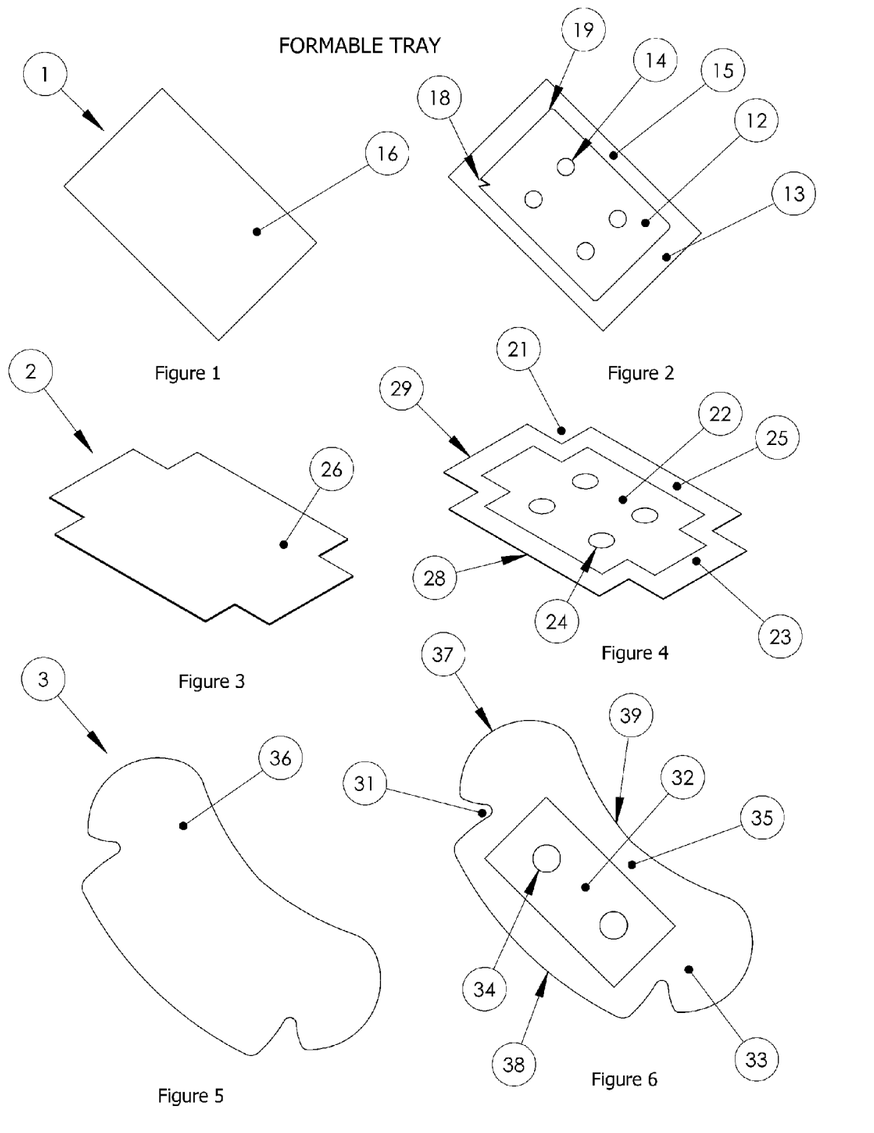
In FIG. 1, the invention is shown in a device 1 in a rectangular configuration.
In FIG. 2, the invention of FIG. 1 is shown with the top layer removed showing the stiffening means.
In FIG. 3, the invention is shown in a device 2 in a cross shaped configuration.
In FIG. 4, the invention of FIG. 3 is shown with the top layer removed showing the stiffening means.
In FIG. 5, the invention is shown in a device 3 in a reniform or "kidney" shaped configuration.
In FIG. 6, the invention of FIG. 5 is shown with the top layer removed showing the stiffening means.
Figure 8:
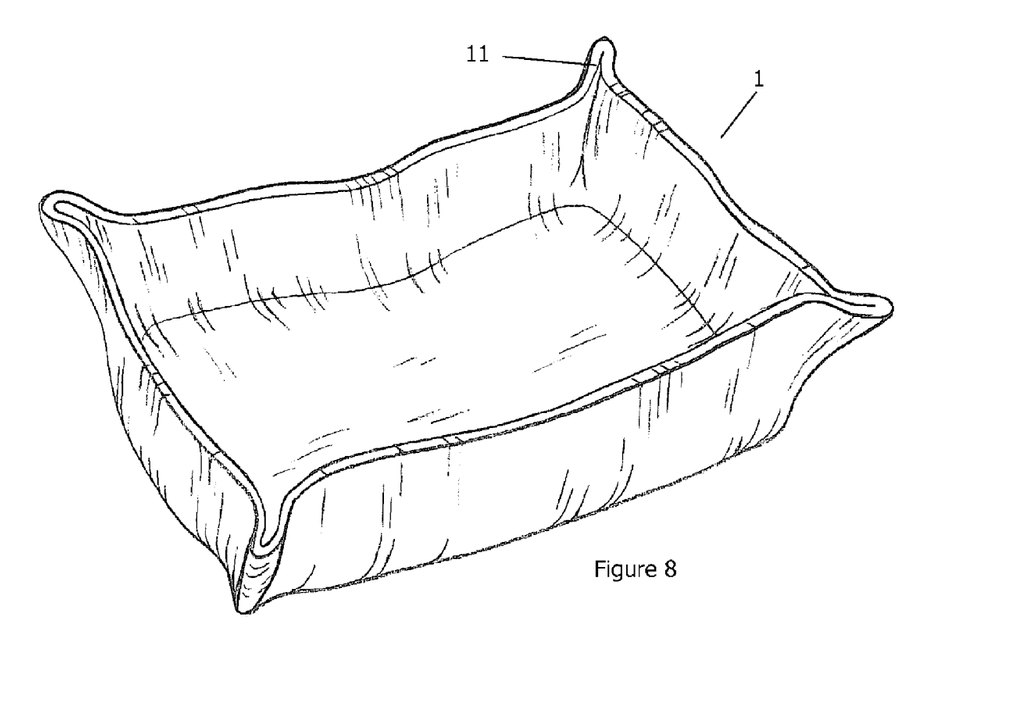
In FIG. 8, the rectangular configuration of the invention is shown with the sides conformed into a vertical orientation.

This invention as disclosed in the drawings has the principle uses in either lining of existing trays or in the shape of a tray formed by the user or by use of a template or mandrel. FIG. 1 is the basic configuration of the device 1 which is in a quadrilateral configuration showing quadrilateral top level 16. FIG. 2 details the device 1 with the removal of top layer 16. Quadrilateral bottom level 13 has thereby imposed upon it a stiffening membrane 12 whose dimension area is less than the dimension area of top and bottom levels 16 and 13 causing a quadrilateral boundary perimeter 15. Membrane 12 has a plurality of through-holes 14 which serves several purposes including; in the lamination process, top level 16 and bottom level 13 are allowed to contact each other forming a bond of like structures thereby preventing the movement of membrane 12 from within the boundary perimeter 15; reduces the weight of the membrane 12, which is critical in the longer applications of the quadrilateral style of device as described in FIGS. 14-16; allows for the insertion of objects therethrough the through-holes as described in FIGS. 17-18 and 4 and decreases the bending moment required to form the device. In this example the through-hole 14 are circular in nature but this invention is not limited to those restraints, so long as the objects of the through-holes are maintained the shape, size and dimension of the through-holes are limitless. The inclusion of a notch 18 is shown as an option on one side of membrane 12 in FIG. 2 thereby breaking the intersecting edges of membrane 12. This notch 18 will aid in the forming of square corners when configured into trays as shown in FIG. 8. Should notch 18 not be used, intersecting edges are radiused as shown as rounded corner 19 which prevents the puncture of the softer top and bottom levels 16 and 13. Materials used in the construction of device 1 preferably include a polymer material for the top and bottom layers. In this disclosure, a high temperature silicone sheeting is used, which has several desirable properties, including being cleaned using high temperatures, such as dishwashers or autoclaves, easily formed and has high coefficient of friction, or has a slight "sticky" or "tacky" quality, on it's surface to aid in the prevention of movement of items placed thereupon. Other similar materials include TPV (Thermoplastic Vulcanizate), EVA thermoplastics, and certain polyolefins blends can be used. It is desirable that the physical properties of the sheeting does not degrade under the flexing cycles nor under the heat and cooling cycles of sterilization. Sterilization means to encompass all forms of sterilization including autoclave and gamma radiation.

Membrane 12 is disclosed in this application as being an object that is placed in the horizontal plane of the device as a stiffening means. The purpose of membrane 12 is to act as a means to stiffen the flexible silicone sheets as the sheets are molded or formed into a configuration required by the user. This stiffening will allow the device to maintain the molded or formed configuration until the user re-molds or re-forms the device into a different configuration. This configuration can be limitless in shape as the membrane is capable of multiple angular deformations in the vertical plane. The word membrane does not limit the application to an object that is of a solid nature. Membrane 12 can be a solid membrane but can also be a weave or mesh of wires, diamond cut lath-like structure or individual solid rods that perform the same purpose and have the same characteristics of membrane 12, said characteristics including multiple angular deformation or forming cycles, malleable, flexible, and capable of holding its (de)formed shaped. In one embodiment, membrane 12 is made from an impermeable stainless steel sheet between 0.0075-0.0125 in thickness depending upon the length of the device. Stainless steel has the quality of being able to be magnetized, is ductile and is malleable. Other materials include aluminum sheets and ductile, treated low carbon steel sheets. It is desirable that the physical properties of the material do not degrade under the flexing cycles nor under the heat and cooling cycles of sterilization. Sterilization means to encompass all forms of sterilization including autoclave and gamma radiation.

Figure 7:
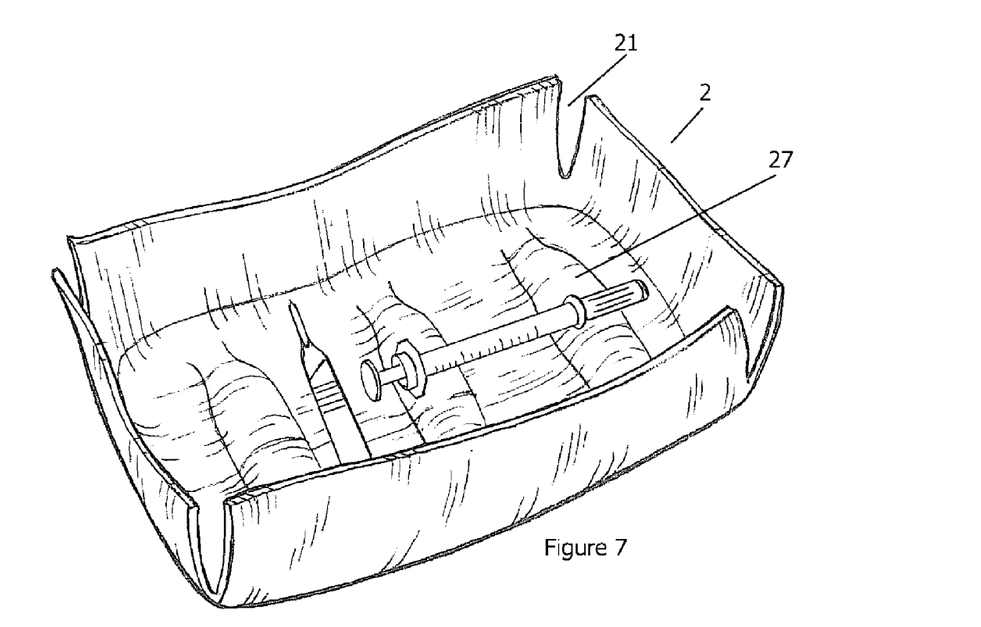
In FIG. 7, the cross shaped configuration of the invention is shown with the sides conformed into a vertical orientation.
Figure 17:
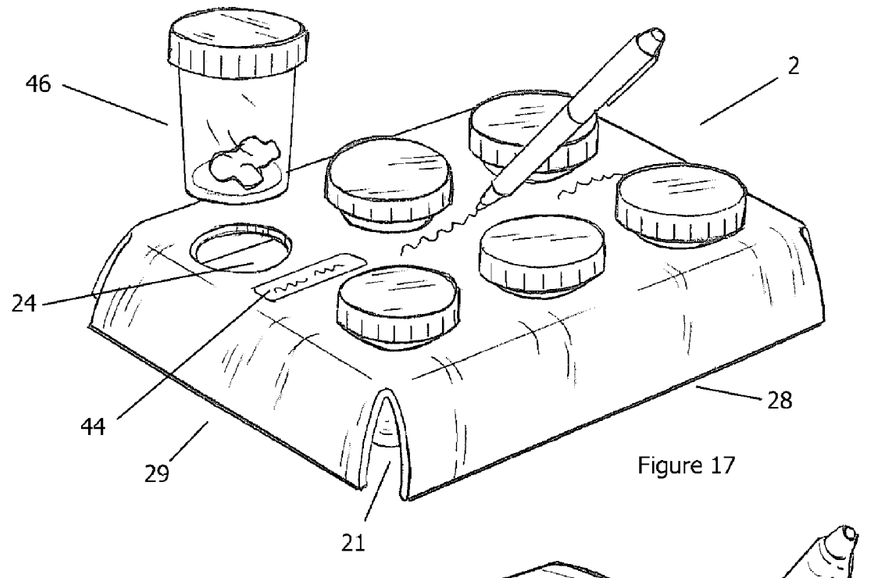
In FIG. 17, through-hole reliefs are shown, whereby specimen and biopsy vials are inserted and labeled, showing the device walls oriented in a downwardly vertical orientation, supporting the device.
Figure 18:
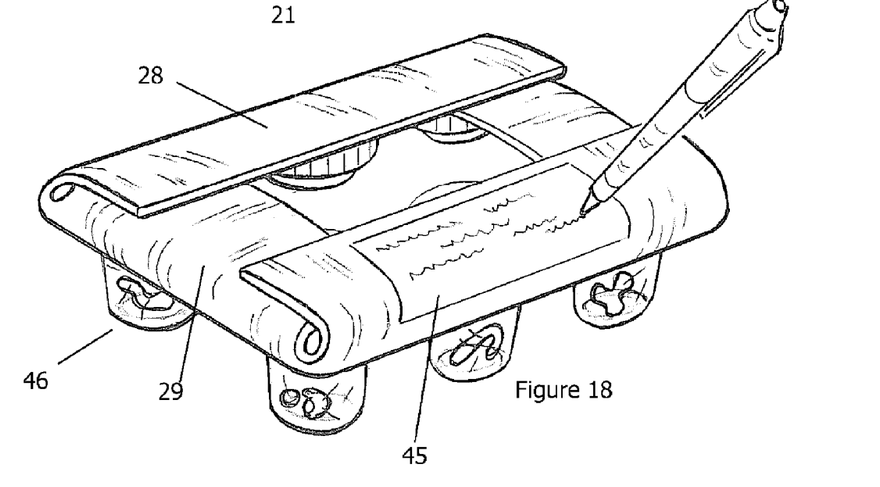
In FIG. 18, the device walls of FIG. 17 are now reconfigured to be on top of the vials securing them in their locations.

FIG. 3 discloses device 2 which is similar in all properties, characteristics and materials as device 1 except that device 2 is constructed of layers in two distinct surfaces that are perpendicular to one another forming a cross-like shape. Cross-shaped device 2 has an upper cross layer 26 and a lower cross layer 23. The longitudinal surface edge 28 and latitudinal surface edge 29 do not intersect but are cut short of intersection by corner vertex 21. It is noted that boundary area 25 has a greater width to facilitate the walls of trays into which this particular device 2 is created for. Corner vertexes 21 have deep reliefs cut to allow for greater flexibility in the conforming of the device 2 into medial trays as shown in FIG. 7. Membrane 22, like membrane 12, is made from a flexible metal sheet, having relief holes 24 which can be completely sealed over by the upper and lower layers 26 and 23 or can be partial to fully exposed to create various holding trays, such as shown in FIGS. 17 and 18.

FIG. 5 discloses a device 3 which is similar in all properties, characteristics and materials as in devices 1 and 2 except that this device is reniform in nature. Like devices 1 and 2, device 3 has a reniform top panel 36 and a coincident lower panel 33. Device 3 is reniform shaped to easily fit into an emesis style of medical tray. Device 3 has a generally shaped arc with a lower major edge 39 and an upper arc minor edge 38, said arc having being terminated at either end by lobes 37, each lobe having a diameter that is less than the distance between edges 39 and 38. One end of lobe 37 emanates along lower edge 39 while the other end of lobe 37 terminates into relief 31 never reaching the upper edge 39. Reniform boundary parameter 35 does not strictly follow the outline of membrane 32, with membrane 32 having relief holes 34 placed thereabout. It should be noted that the use of relief holes in any of the aforementioned devices is optional and are used for various purposes, weight reduction, bending moment reduction, allowance for placement of items into a through-hole and decreasing cost.

Figure 9:
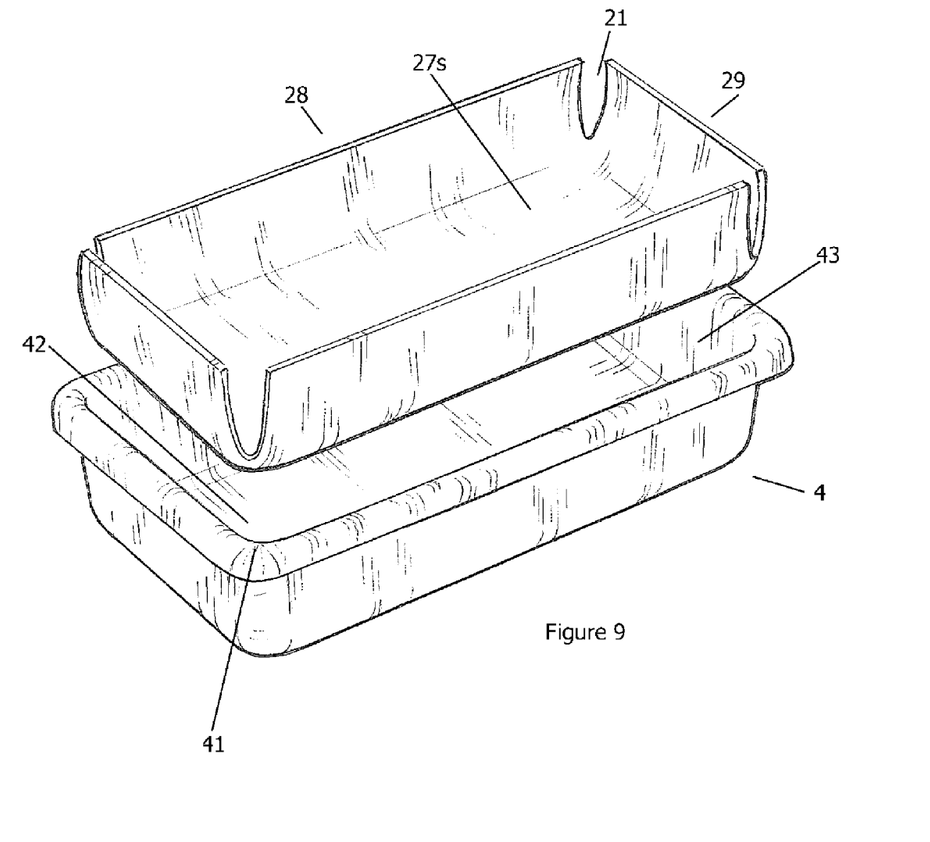
In FIG. 9, the cross shaped configuration of the invention is shown after being conformed by the vertical wall of the medical tray.

FIG. 7 discloses the use of device 2 that has been formed into the shape of a tray. The forming of this tray is performed by hand or by pressing the device 2 into a form, as in a medical tray, or upon a mandrel. It is seen that the bottom of the tray has ridges 27 formed thereon by the user. FIG. 9 shows a smooth bottom 27s as desired by user. These ridges are formed at the desire and need of the user and are able to be rapidly reformed upon desired application. These ridges perform several purposes, including but not limited to, the raising of the instrument or object above the surface of the tray, enabling an ease of picking up the instrument or object by gloved medical personnel and to create small shallow basins within the tray to isolate or contain certain instruments or objects away from others. It can be seen that the vertex 21 is open allowing for a more easily formed tray.

FIG. 8 is a similar tray as in FIG. 7 but is formed using device 1 where by the corners 11 formed are "pinched" or pleated providing a secure tray upon which liquids will be contained therein with the chance of leakage, as would be an occurrence with the similar use of device 2. The device shown in FIG. 8 does not have any ridges formed by the user, as desired by the application.

Figure 10:
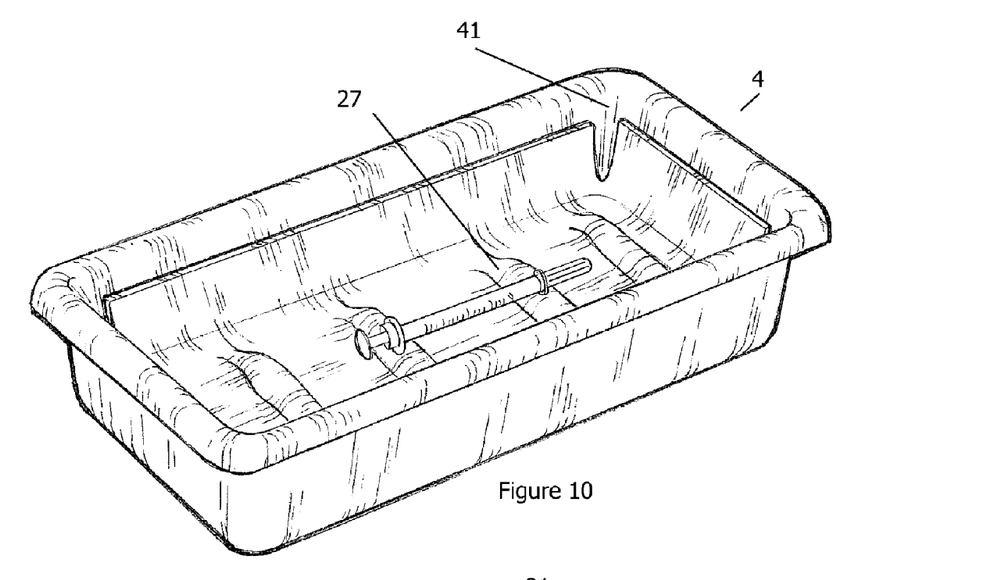
In FIG. 10, the cross shaped configuration of the invention shown in FIG. 9 is seated into the medical tray, noting the ridges on the bottom of the device created using the stiffening means.
Figure 11:
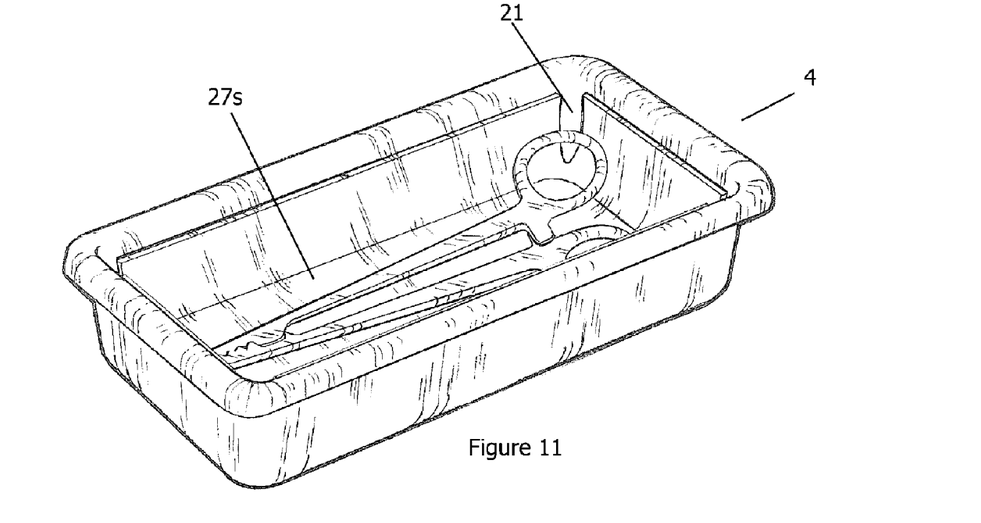
In FIG. 11, the cross the cross shaped configuration of the invention shown in FIG. 9 is seated into the medical tray, noting the bottom is smooth.
Figure 12:
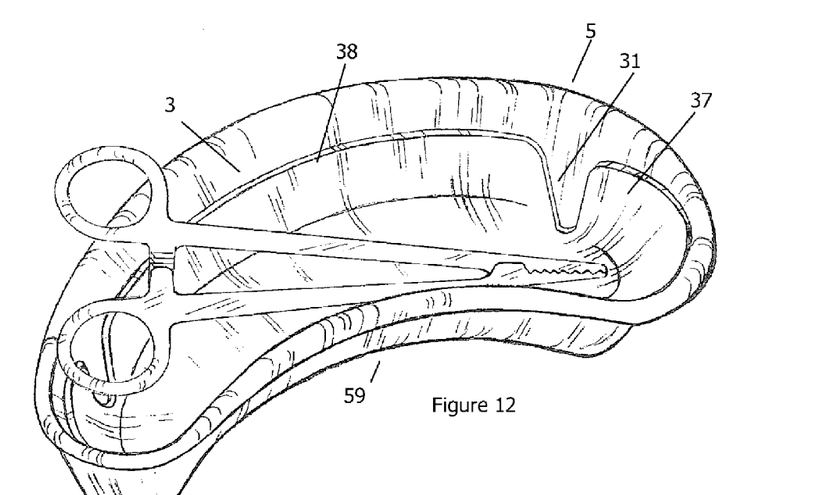
In FIG. 12, the reniform shaped configuration of the invention is shown as it conforms to the contours of a kidney shaped medical tray.
Figure 29:
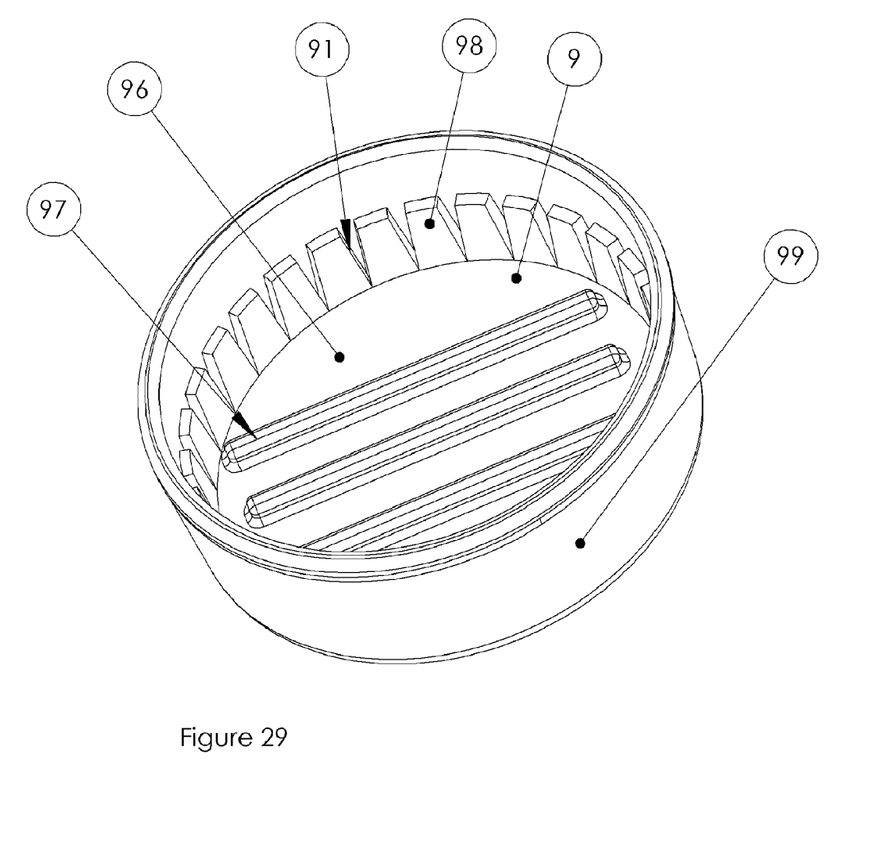
In FIG. 29, an embodiment of the invention where it is formed by and into a circular bowl commonly found in an operating room.

FIG. 9 highlights one method of forming the device 2 into a tray. Medical tray 4, usually made of stainless steel having a planar bottom 42 and vertical walls 43. Medical trays can also be in "kidney" shaped configurations as shown in FIG. 12, as tray 5. As most stainless steel trays are stamped from a single sheet, the corners 41 are normally rounded. Device 2 is pressed into the tray and is then removed. Membrane 22 enables the device to maintain it's shape and upon removal creates a tray with stable walls ready for use. FIGS. 10, 11 and 12 show the use of device 2 and 3 as tray liners. Device 2 with vertex 22 and device 3 with the relief 31, enables a device to be quickly formed with minimal effort into the trays forming a smooth inner surface without any of the device protruding into the interior of the tray interfering with the use of the tray and the removal and insertion of instruments and objects. FIG. 29 shows an embodiment of the invention as device 9, where there are multiple lobes 98 which are a result of multiple vertexes 91 cut into upper layer 96. These lobes 98 allow for the device to be placed into Device 9 which is circular in shape and maintain a close fit to the bottom and the sides of the circular basin. Device 9 is designed for round basins 99 with either straight sides or slopes side that are primarily used in operating rooms, though the use is not limited thereto. Device 9 is disclosed as circular in nature but this does not limit the scope to other objects which are round in nature, such as ovals, oblongs or are elliptical in shape. As with other devices disclosed, the stiffening member 92, not shown in the drawing, allows for the forming of the device into self-sustaining ridges 97 that are formed through the upper layer 96.

Figure 13:
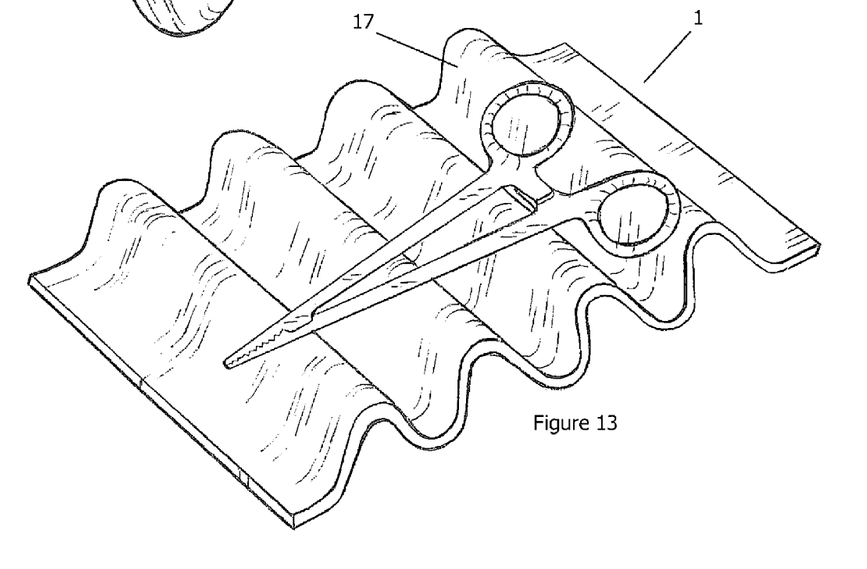
In FIG. 13, the rectangular shaped configuration of the invention is shown where the surface has ridges placed intermittently as formed by the user or upon a set mandrel.
Figure 14:
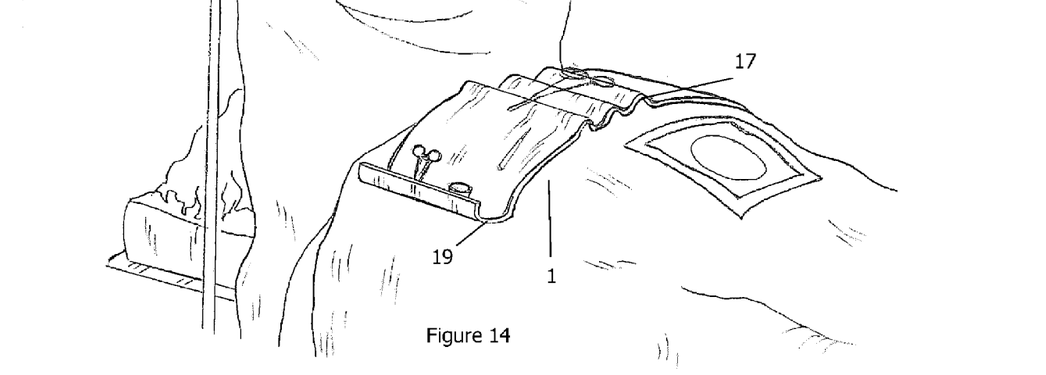
In FIG. 14, the rectangular shaped configuration of the invention is shown as a long "drape" across a patient, where the device is formed into varying shapes depending on the requirements of the user.
Figure 15:
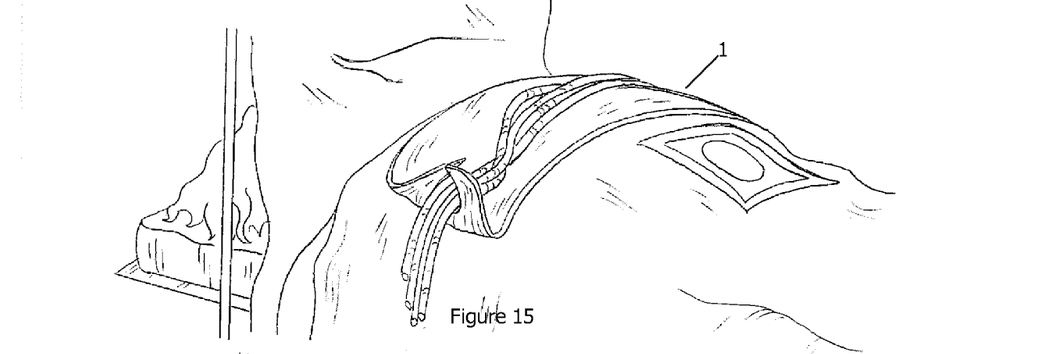
In FIG. 15, the rectangular shaped configuration of the invention is shown as a long "drape" across a patient, where the lower end of the device is formed into a tunnel, allowing for the containment or bundling of various tubes and irrigation devices.
Figure 16:
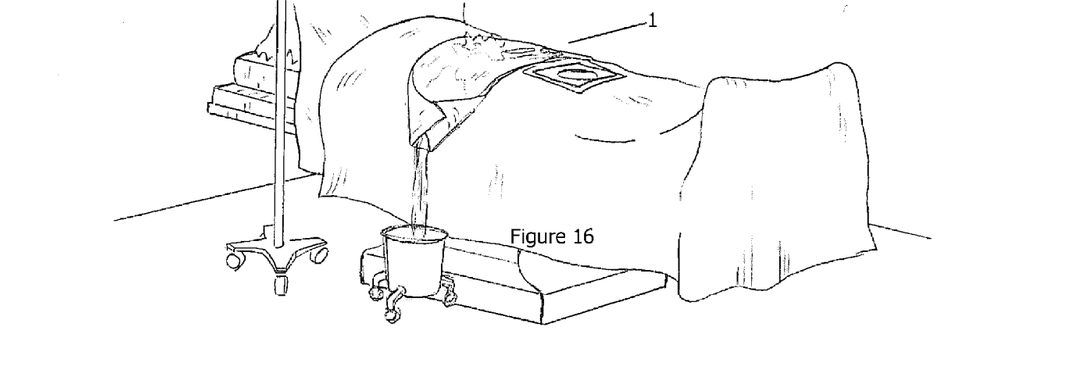
In FIG. 16, rectangular shaped configuration of the invention is shown as a long "drape" across a patient, where the device is formed into a funnel, allowing for the containment and channeling of fluids into a waste receptacle.

In FIG. 13, device 1 is shown where the user has escalloped ridges 17 into the device and is using the device as a mat, holding a medical instrument in such an orientation to facilitate easy retrieval and deposit of the instrument. As herein described, device 1 can be formed into the need of the user. FIGS. 14-16 show device 1 in the fashion of a medical drape. FIG. 17 shows the device 1 being used as a drape having a certain section with escalloped ridges 17 to hold instruments and the edges of the drape are shaped into a gutter 19, whereby used instruments can be kept away from sterile ones on the drape as well has forming a containment wall. FIG. 15 shows the same drape whereby the minor edge is formed into a collar to corral and organizing various tubes, drains and irrigation devices into a neat bundle. FIG. 16 details the use of device 1 as a drape whereby the minor edge is formed into a tunnel whereby contaminated fluids from instruments, gauzes and the like are funneled into a container.

FIGS. 17 and 18 show a unique use for device 2. With the separate edges of major edge 28 and minor edge 29 downwardly directed and through-holes 24 created through the upper and lower layers 26 and 23, specimen or biopsy containers 46 are placed there through and labeled on markers 44. Upon collection of necessary samples, the containers 46 are securely enclosed within the through-holes and further identification label 45 can be completed.

As herein described, another use of the device 1 is its application in the baking industry. In its planar or flat orientation, device 1 is a baking sheet suitable for baking cookies and the like. Certain breads and pastries are round by nature and require lateral support during baking. The device 1 is formed into escallops by the user in a form suitable for the particular lateral support needs and the device 1 is loaded and is ready for the next steps of raising and baking.

Figure 20:
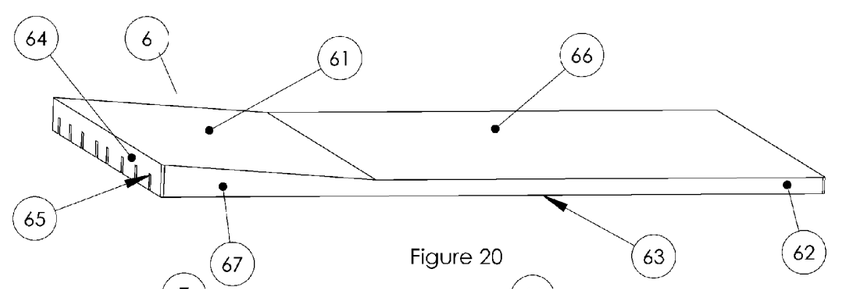
In FIG. 20, the device of FIG. 1 is shown in an embodiment of the invention from an oblique view showing the left side and head of the device, along with a wedge shaped head portion.
Figure 21:
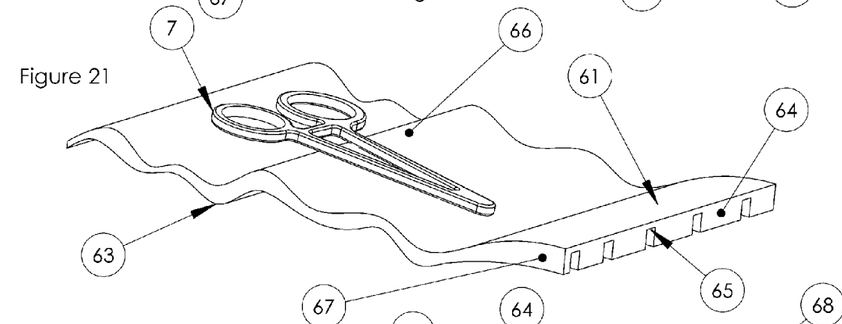
In FIG. 21, the device of FIG. 20 is shown where the body of the device has been escalloped.
Figures 22, 23:
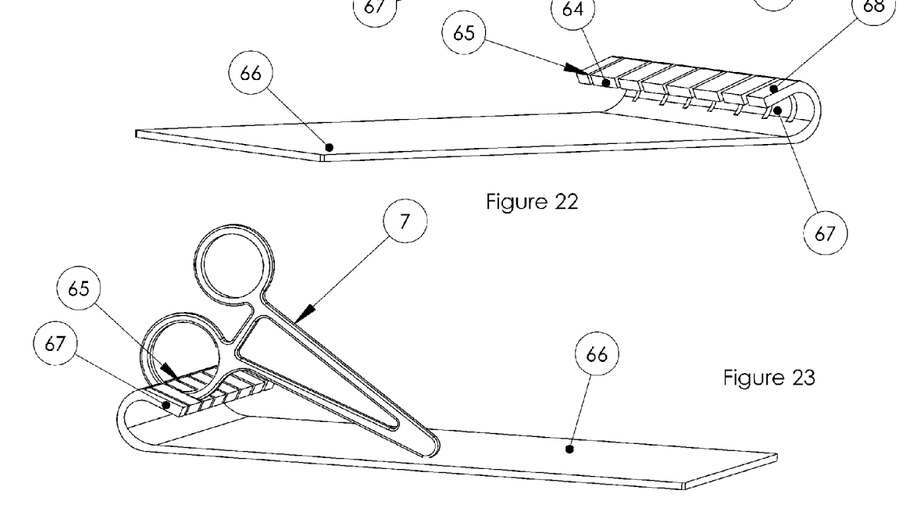
In FIG. 22, the device of FIG. 20 is shown with the front lip of the head of the device rotated onto the body of the device, also this figure shows an embodiment of the device whereby the slots are cut completely through both layers.
In FIG. 23, the device of FIG. 22 is shown with a medical instrument placed into the open slots of the rotated head of the device.
Figure 24:
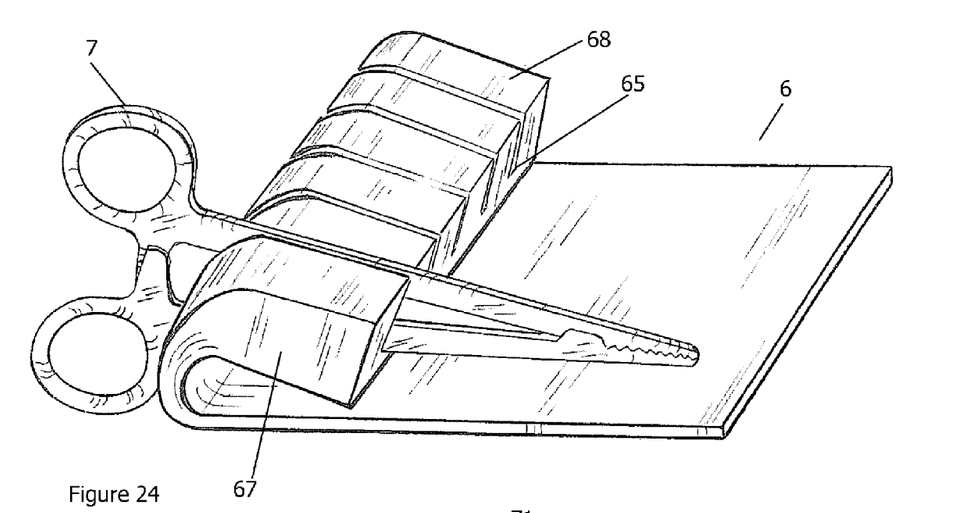
In FIG. 24, the device as shown in FIG. 20 with the wedge portion folded over with the addition of a medical instrument resting therethrough.
Figure 25:
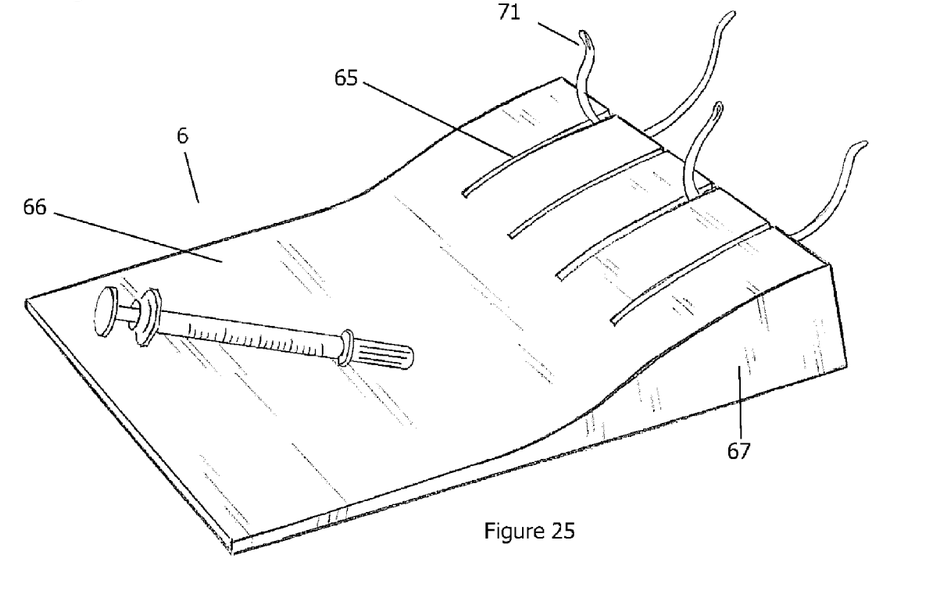
In FIG. 25, the device is as in FIG. 20 is shown with the slots shown on the upper layer of the wedge.

One embodiment of the invention, which is shown in FIG. 20, is the addition of a wedge-shaped head to the device described as device 1. Fold-over mat 6 has an upper level 66 and a lower level 63 which laminates to stiffening member 62 (not shown). Lower level 63 extends the entire length of device 6, while upper level 66 and stiffening member 62 terminate at the commencement of an inclined planar surface wedge 67 which commences the wedge shaped foldover portion 61 of device 6. Upper level 66 is capable of maintaining a user induced form as seen in FIG. 21 with the aid of the stiffening member 62. Foldover portion 61 is a flexible portion of device 6 which is capable of being folded over upon itself, whereby wedge end 64, which is facing outwardly at the start is now rotated up to 180 degrees and is facing in the opposite direction, thereby exposing instrument slots 65 as seen in FIG. 22. Slots 65 in one embodiment, as shown in FIG. 21 do not extend completely from the lower level to the upper layer of device 6, also shown in FIG. 24, The size of the wedge is variable upon the size of the instruments that will be held. FIG. 23 shows a narrow wedge 67 that produces a shallow slot 65 holding a medical instrument 7, where FIG. 24 shows a wider wedge 67 with deeper slots 65 that can hold the medical instrument 7 in a different orientation. It is disclosed in FIG. 23, that the slots 65 need not be completely cut through to the upper level to hold medical instruments 7. Another embodiment of the style of device 6 is shown in FIG. 22, where slots 65 are completely cut through the upper and lower levels . The complete cut through enables device 6 to hold instruments or sharps in this case without the need to fold over the foldover portion 61. An embodiment of this invention is the separation of a magnetic zone from a non-magnetic zone on the device 6. For example, it is advantageous for certain instruments to be magnetic or magnetized by the presence of magnetism, but there are certain instruments, such as needles that one does not want to be magnetized. In this embodiment, shown in FIG. 25, the upper layer 66 portion of device 6 can be magnetized while the wedge 67 can hold the suture needles 71 in the correct orientation and far away from the magnetized areas. It is seen by the embodiments that the number of slots 65 are defined by the user by task and that the area between the slots 68 can be variable or consistent in width.

Figures 26, 27, 28:
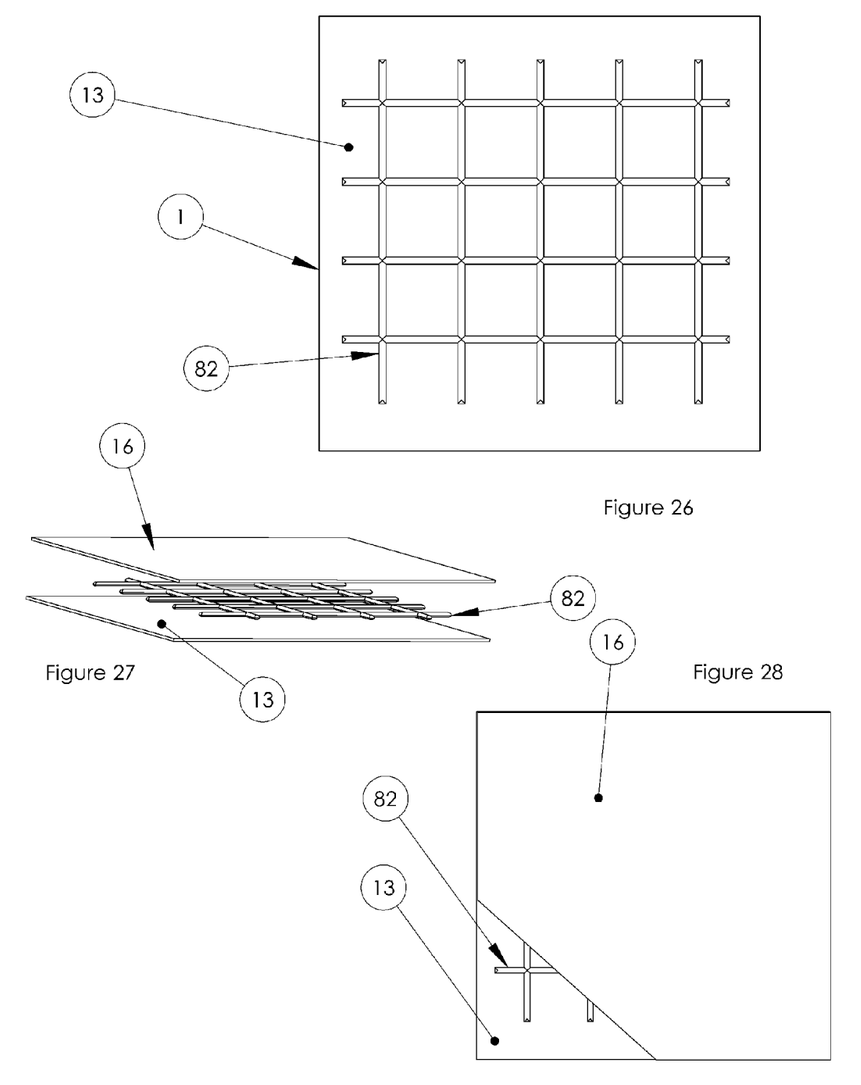
In FIG. 26, an embodiment of device 1 is shown having an open wire mesh as the stiffening means.
In FIG. 27, is a side elevation showing the components of the device prior to lamination.
In FIG. 28, a completed device showing a cut-away of the corner showing the wire mesh stiffening means.

FIG. 26 shows an embodiment of the invention whereby any aforementioned device can have a stiffening means that is some material other than a metallic sheet. FIG. 26 shows an embodiment for device 1 but can be associated with devices 2 and 3. Stiffening means 82 is a wire mesh like arrangement. In FIG. 28 the wire mesh is a weave of solid wire rods that serve to provide the same results of producing a self-sustaining shape when formed into a particular shape or configuration. The wires will have similar properties to the stiffening means 12, 22 and 32 in that they must be able to withstand many cycles of deformation, be able to withstand the heat that the sheeting material will be subjected to and be able to be laminated to the sheeting material without physical degradation. This embodiment creates a lighter weight device and one that is more economically produced and could thusly be used as a single use or disposable fashion by the user.

Figure 19:
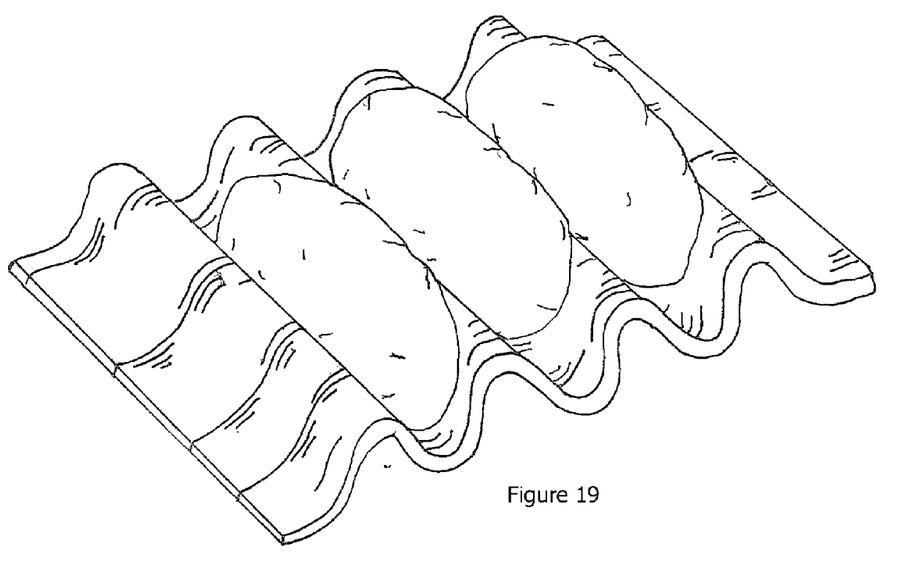
In FIG. 19, the device of FIG. 1 is now formed into escalloped ridges suitable for the baking of bread.

Another embodiment not shown on FIG. 26 is the use of wires as a stiffening means whereby the wires only run in a longitudinal direction without any wires running laterally to them. This allows to the user to create the ridges 27 for uses such as shown in FIGS. 13, 14 and 19. Again the economic value of these few wires create a more economically viable product for single use applications while providing all of the advantages of a user formed mat.

This detailed description discloses the best mode of practicing this invention but does not limit the scope of this invention to only materials and compositions notated herein. It is within the spirit and disclosure of this application to use the disclosed invention in many other fields of application. Applicant has chosen two fields of application as they serve as the best mode of practicing this invention. It is obvious that one skilled in the art can develop alternative methods to accomplished the objects of this invention, but this disclosure and subsequent claims develop the scope of this invention.

What is claimed is:

1. A self-sustaining configurable device for the retention of objects, capable of multiple forming cycles comprising of:
    a top layer, having a defined perimeter,
    a bottom layer, said bottom layer having a common perimeter with said top layer, and
    a stiffening means laminated therebetween said top layer and said bottom layer said stiffening means does not contact the perimeter of said top layer and said bottom layer, and where said stiffening means is a planar membrane that is flexible and malleable, and said membrane is capable of multiple flexing cycles without degradation of physical properties, said membrane capable of maintaining an angular or sinusoidal deformation from the horizontal plane along any portion of said membrane.

2. A self-sustaining configurable device for the retention of objects as in claim 1 where said stiffening means is a set of longitudinally located horizontal metallic rods with a diameter sufficient to maintain an angular or sinusoidal deformation of said rod and said upper and lower surfaces from the horizontal plane along any portion of said apparatus, said rods capable of having at least one relief cut therethrough, said rods capable of multiple deforming cycles without degradation of said rod physical properties.

3. A self-sustaining configurable device for the retention of objects as in claim 1 where said perimeter is bounded by 2 sets of edges, said sets of edges are perpendicular to one another and said sets of edges do not intersect thereby forming vertexes.

4. A self-sustaining configurable device for the retention of objects as in claim 1 where said perimeter a plurity of straight sides of two different lengths.

5. A self-sustaining configurable device for the retention of objects as in claim 1 where said perimeter is curved and without sharp angles, where said perimeter has a plurality of vertexes cut from the perimeter towards the center of the apparatus.

6. A self-sustaining configurable device for the retention of objects as in claim 1 where said membrane is an impermeable metallic membrane with a thickness sufficient to maintain said deformation of said membrane and said top and lower layers, said membrane capable of having at least one relief cut therethrough, said metallic membrane capable of being magnetized.

7. A self-sustaining configurable device for the retention of objects as in claim 1 where said membrane is a horizontal arrangement of metallic wires with a plurality of evenly spaced and uniform openings between said wires, said wires having a diameter sufficient to maintain a vertical deformation of said wires and said top and lower layers, said wires capable of having at least one relief cut therethrough.

8. A self-sustaining configurable device for the retention of objects, capable of multiple forming cycles comprising of:
    an upper level, having a defined perimeter having 2 sets of parallel sides,
    an inclined plane emanating from and in lateral communication with said upper level said plane containing a plurality of vertically oriented slot openings, said slot openings being parallel to each other and parallel with the horizontal axis of said inclined plane, where said openings extend vertically from said lower level, said openings not being in communication with said upper level,
    a lower level, with a common perimeter with said upper level, and
    a stiffening means laminated therebetween said upper level and said-lower level, said stiffening means not extending through the entirety of said inclined plane.

9. A self-sustaining configurable device for the retention of objects as in claim 8 where said openings extend downwardly from said inclined face, said openings not being in communication with said lower level.

10. A self-sustaining configurable device for the retention of objects as in claim 8 where said openings extend upwardly vertical from said lower level, communicating through said upper level.

11. A self-sustaining configurable device for the retention of objects as in claim 8 where said stiffening means is a planar membrane that is flexible and malleable, and said membrane is capable of multiple flexing cycles without degradation of physical properties, said membrane capable of sustaining an angular or sinusoidal deformation from the horizontal plane along any portion of said membrane.

12. A self-sustaining configurable device for the retention of objects as in claim 8 where said stiffening means is a set of longitudinally located horizontal metallic rods with a diameter sufficient to maintain a vertical deformation of said rod and said upper and lower levels said rods capable of having at least one relief cut therethrough, said rods capable of multiple deforming cycles without degradation of said rod physical properties.

13. A self-sustaining configurable device for the retention of objects as in claim 11 where said membrane is an impermeable horizontal metallic membrane with a thickness sufficient to maintain a vertical deformation of said membrane and said upper and lower levels, said membrane capable of having at least one relief cut therethrough.

14. A self-sustaining configurable device for the retention of objects as in claim 8 where said membrane is a horizontal arrangement of metallic wires with a plurality of evenly spaced and uniform openings between said wires, said wires having a diameter sufficient to maintain a vertical deformation of said wires and said upper and lower levels, said wires capable of having at least one relief cut therethrough.

15. A self-sustaining configurable device for the retention of objects as in claim 8 where said inclined plane is capable of being rotated along intersection of said inclined plane and said upper level.

* * * * *